United States Patent
Meyers

(10) Patent No.: US 7,031,931 B1
(45) Date of Patent: Apr. 18, 2006

(54) PORTABLE DEVICE ATTACHED TO A MEDIA PLAYER FOR RATING AUDIO/VIDEO CONTENTS

(75) Inventor: Stephan Meyers, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/538,677

(22) Filed: Mar. 30, 2000

(51) Int. Cl.
    *G06Q 90/00* (2006.01)
(52) U.S. Cl. .......................... 705/10; 725/109; 711/100
(58) Field of Classification Search .................. 705/10, 705/1, 7, 8; 711/115, 100; 725/109
    See application file for complete search history.

(56) References Cited

U.S. PATENT DOCUMENTS

| | | | |
|---|---|---|---|
| 5,410,344 A | 4/1995 | Graves et al. .................. 348/1 |
| 5,790,426 A | 8/1998 | Robinson ..................... 364/554 |
| 5,794,127 A * | 8/1998 | Lansang ................ 340/825.72 |
| 5,912,696 A * | 6/1999 | Buehl .......................... 455/26.1 |
| 5,945,987 A * | 8/1999 | Dunn .......................... 345/718 |
| 5,963,916 A * | 10/1999 | Kaplan ......................... 705/26 |
| 5,986,200 A * | 11/1999 | Curtin ......................... 84/609 |
| 6,016,475 A | 1/2000 | Miller et al. .................... 705/1 |
| 6,167,253 A | 12/2000 | Farris et al. ................. 455/412 |
| 6,188,398 B1 | 2/2001 | Collins-Rector et al. ..... 345/327 |
| 6,192,340 B1 | 2/2001 | Abecassis ................... 704/270 |
| 6,195,692 B1 * | 2/2001 | Hsu ............................ 709/219 |
| 6,199,076 B1 | 3/2001 | Logan et al. ................ 707/501 |
| 6,202,062 B1 | 3/2001 | Cameron et al. ............... 707/3 |
| 6,208,335 B1 * | 3/2001 | Gordon et al. ............... 345/721 |
| 6,248,946 B1 * | 6/2001 | Dwek ........................... 84/609 |
| 6,260,192 B1 * | 7/2001 | Rosin et al. ................... 725/39 |
| 6,314,094 B1 | 11/2001 | Boys .......................... 370/352 |
| 6,356,971 B1 * | 3/2002 | Katz et al. ................... 710/301 |
| 6,389,467 B1 * | 5/2002 | Eyal ........................... 709/223 |
| 6,430,537 B1 * | 8/2002 | Tedesco et al. ................ 705/8 |
| 6,484,199 B1 * | 11/2002 | Eyal ........................... 709/223 |
| 6,502,194 B1 * | 12/2002 | Berman et al. ............. 713/201 |
| 6,539,395 B1 * | 3/2003 | Gjerdingen et al. ......... 707/102 |
| 6,587,127 B1 * | 7/2003 | Leeke et al. ................. 345/765 |
| 6,631,522 B1 * | 10/2003 | Erdelyi ......................... 725/53 |
| 6,735,628 B1 * | 5/2004 | Eyal ........................... 709/223 |
| 2002/0116476 A1 * | 8/2002 | Eyal et al. ................... 709/219 |

FOREIGN PATENT DOCUMENTS

EP   0 854 645 A2   7/1998

(Continued)

OTHER PUBLICATIONS

"Microsoft: Cirrus and Microsoft to enable portable music devices based on Windows media Technology", M2 Presswire, Sep. 28, 1999 [retrieved on Jan. 19, 2003], 3 pages, Retrieved from: Dialog, file 636.*

(Continued)

*Primary Examiner*—Tariq R. Hafiz
*Assistant Examiner*—Beth Van Doren
(74) *Attorney, Agent, or Firm*—Cohen, Pontani, Lieberman & Pavane

(57) ABSTRACT

A portable rating apparatus for rating one of audio and video content. The apparatus includes a user-manipulable control dedicated for generating a signal indicating a rating of a media content. The rating corresponds to one of a plurality of categories of preferences. A processor, operatively connected to the user-manipulable control, receives the signal from the user-manipulable control and associates the rating with the media content. A memory device, operatively connected to the processor, stores the rating associated with the media content.

9 Claims, 2 Drawing Sheets

FOREIGN PATENT DOCUMENTS

| WO | WO 83/03181 | * | 9/1983 |
|----|-------------|---|--------|
| WO | WO 99/35830 | * | 7/1999 |

OTHER PUBLICATIONS

"The Sound of things to come", ampcast.com, 11/16/199 [retrieved Oct. 10, 2003], 1 page, retrieved from: google.com and archive.org.*

"Nielson Media Research", www.nielsenmedia.com, Feb. 2, 1998 [retrieved Oct. 10, 2003], pp. 1-22, retrieved from: google.com and archive.org.*

"MP3 playlist maker", Sassner.com, May 8, 1999 [retrieved on Oct. 10, 2003], pp. 1-9, retrieved from: google.com and archive.org.*

"Home of Audio-Video Softwares Up and Date", MPEGX.com, Oct. 12, 1999 [retrieved on Oct. 10, 2003], pp. 1-13, retrieved from: google.com and archive.org.*

Screenshots of www.musicmatch.com, Dec. 3, 1998-Feb. 2, 1999 [retrieved Apr. 6, 2004], pp. 1-3, retrieved from: google.com and archive.org.*

"MusicMatch delivers breakthrough music personalization service in new musicmatch jukebox", press release from www.musicmaker.com, Feb. 22, 2000 [retrieved Apr. 6, 2004], 2 pages, retrieved from:archive.org and google.com.*

"MusicMatch and Xing Technology Introduce MusicMatch Jukebox", press release from www.musicmaker.com, May 18, 1998 [retrieved Apr. 6, 2004], 2 pages, retrieved from: archive.org and google.com.*

"Rio PMP 300", Screenshots of www.diamonmm.com, Apr. 29, 1999 [retrieved Apr. 8, 2004], pp. 1-14, retrieved from: google.com and archive.org.*

MusicMatch Jukebox Audiosoftware, http://www.musicmatch.com/info/company/press/releases/?year1998&release=2, May 18, 1998.

* cited by examiner

US 7,031,931 B1

PORTABLE DEVICE ATTACHED TO A MEDIA PLAYER FOR RATING AUDIO/VIDEO CONTENTS

BACKGROUND OF THE INVENTION

1. Field of the Invention

The present invention relates to content rating devices and, more particularly, to a portable device with dedicated controls for rating audio/video contents.

2. Description of the Related Art

The explosive growth of the Internet has fundamentally changed the way audio contents are delivered to consumers. Traditional radio or TV broadcasting, i.e. the transmission of contents using analog radio waves, will soon be supplanted by a variety of programming distributed over the Internet where the consumers can now "tune" to numerous "channels" (i.e., Web sites). However, the number of choices will far exceed their ability to identify those channels using known user interface.

There exists a class of Web-based solutions known as automated collaborative filtering (ACF). A Web server executing the ACF collects preference information from various users concerning certain products and services and stores the information in a database. The Web server then identifies users with similar preferences and provides recommendations to an individual one of those identified users concerning products and services interested by the other identified users. For example, an online shopper selecting books from a Web site can be provided with recommendations concerning other books bought by people who are also interested in the books selected by the online shopper. However, known ACF systems are ill-suited for portable media players.

There is thus a need for a portable rating apparatus for rating audio/video contents downloaded from the Internet.

SUMMARY OF THE INVENTION

An object of the present invention is to provide a portable rating apparatus for rating audio/video contents.

According to an aspect of the invention, the portable rating apparatus includes a user-manipulable control configured to indicate rating of an audio/video content (defined as "media content", hereinafter) with respect to a number of predefined categories of preferences. The user-manipulable control may include, for example, a plurality of depressible buttons or a rotatable multi-position switch. As a media player plays a media content, the user rates the content by actuating the user-manipulable control to generate a signal representing one of a plurality of categories of preferences (e.g., "Never play this again" and "Play this a lot"). A processor receives the signal and associates the media content with the user-indicated category of preference. A memory device, operatively connected to the processor, stores the rating associated with the media content. The portable rating apparatus advantageously enables a media player to selectively download and play media contents based on the user-supplied ratings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements.

DETAILED DESCRIPTION OF THE PRESENTLY PREFERRED EMBODIMENTS

Figure 1:
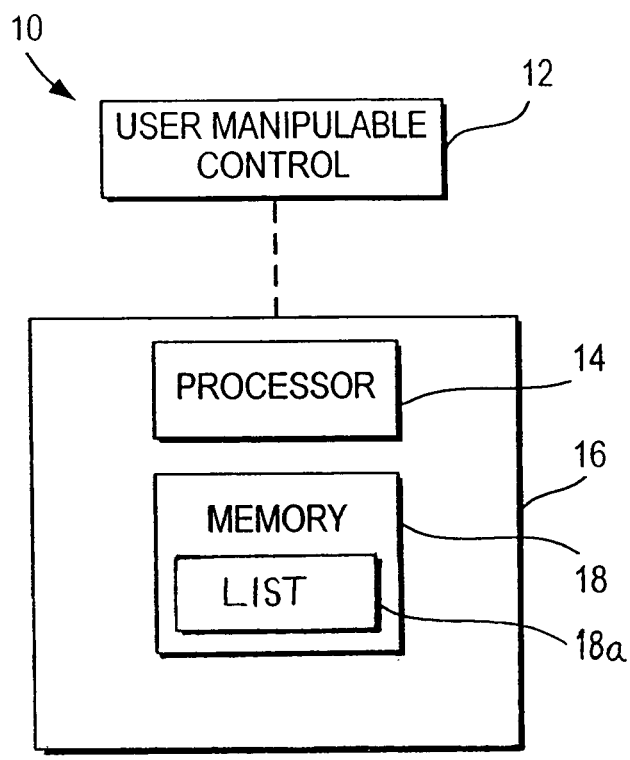
FIG. 1 schematically illustrates a portable rating device in communication with a media player.

A portable rating apparatus constructed in accordance with a presently preferred embodiment of the present invention is shown in FIG. 1. The portable rating apparatus 10 comprises a user-manipulable control 12 dedicated for rating a media content. The user-manipulable control 12 is configured to generate a rating signal corresponding to one of a plurality of predefined ratings or categories of preferences upon actuation by a user. The rating signal generated by control 12 may be transmitted wirelessly or via a wire to a processor 14 for processing media content from a memory device 18 and the rating signal from control 12. The categories of preferences may be quantitative (e.g., 1 through 5) or qualitative (e.g., "Play this a lot!" through "Never play this again"). The user-manipulable control 12 may include, for example, a plurality of depressible buttons such that each depressible button corresponds to one of the plurality of predefined categories of preferences. Alternatively, the user-manipulable control 12 includes a multi-position switch, slidable or rotatable to a number of positions, each position corresponding to one of the predefined categories of preferences.

The processor 14 plays media contents stored in a memory device 18 and, upon receipt of the rating signal from the user-manipulable control 12, the processor 14 associates the user-indicated rating with a currently playing media content. The processor 14 then stores the content rating in the memory device 18 as the user rates each media content and thereby compiles a ratings list 18a. Based on the stored content ratings, the processor 14 selectively plays, using a conventional algorithm, a media content preferred or probably preferred by the user.

In one embodiment, the user-manipulable control 12 is incorporated in a headphone so that as the user listens to an audio content, he or she rates a currently playing audio content by manipulating the control 12 at the headphone. In the case where the headphone includes a cord connected to the media player, the user-manipulable control 12 may optionally be attached to the cord.

In another embodiment, the user-manipulable control 12 is incorporated in a media player 16. The media player may be a virtual broadcasting device as described in detail in co-pending application entitled "Cache Device And Method For Generating A Virtual Radio Or Television Broadcast" (Ser. No. 09/513,964), which is incorporated herein by reference.

Figure 2:
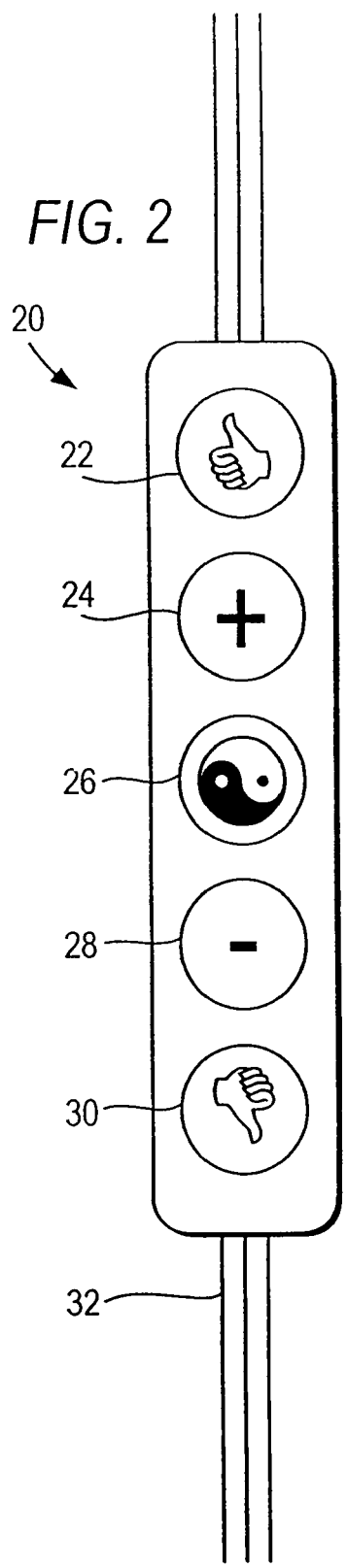
FIG. 2 depicts a rating device including a plurality of depressible buttons.

As shown in FIG. 2, an exemplary multi-button switch 20 is constructed to have five depressible buttons 22–30 corresponding to five categories of preferences, with the first button 22 indicating the most positive or highest rating and the fifth button 30 indicating the most negative or lowest rating. The buttons 24–28 indicate intermediate levels of ratings between the most positive and the most negative ratings. The switch 20 may be connected to a cord 32 of a headphone wired to the media player 16.

Figure 3:
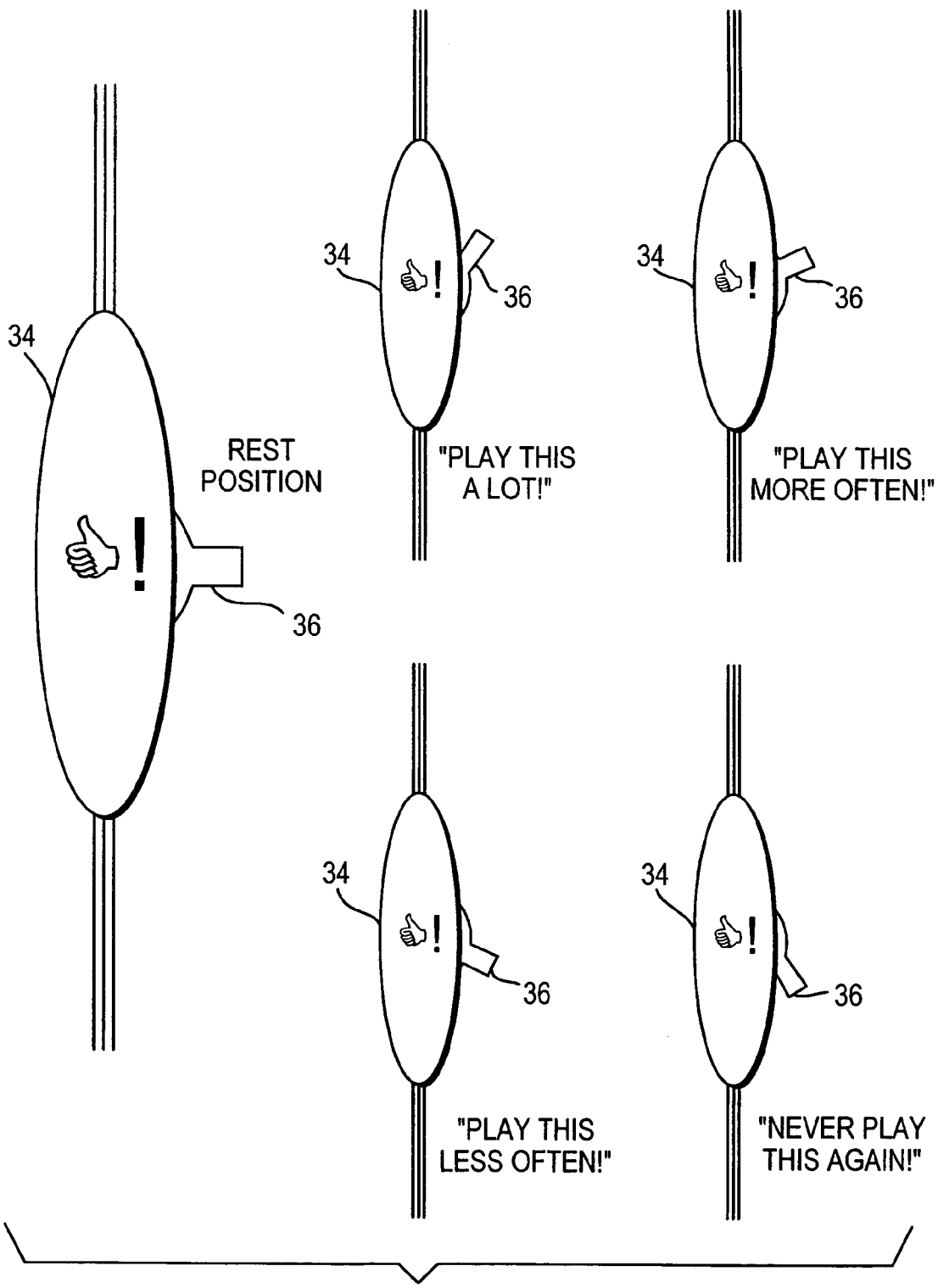
FIG. 3 depicts a rating device including a multi-position switch.

FIG. 3 illustrates an exemplary multi-position switch 34 having a lever 36 that is movable among five different positions corresponding to five categories of preferences, for example: (1) "Play this a lot!" (the most positive rating), (2) "Play this more often", (3) "Rest/Neutral", (4) "Play this less often", and (5) "Never play this again" (the most negative rating). The lever 36 may be resiliently urged to return to the "Rest/Neutral" Position.

In either case (i.e., using either the switch of FIG. 2 or FIG. 3) and according to one algorithm, the media contents are ranked or ordered by the user in an ascending ratings list. For example, if the highest positive rating is indicated, the currently playing content is moved to the top of the ratings list. If the next highest (or intermediate positive) rating is indicated, the currently playing content moves up the ratings list by one slot. If a neutral rating is indicated, i.e., when the user indicates neither a positive nor a negative rating, the currently playing content stays in the same slot on the ratings list. If not yet rated, the currently playing content stays at the bottom of the list. When a negative rating is indicated, the currently playing content moves down one slot on the list, if it is not already at the bottom of the list. When the most negative or lowest rating is indicated, the currently playing content is moved to or stays at the bottom of the list. Similarly, a descending ratings list may also be compiled using the above technique.

In use, as the media player 16 plays a media content, the user rates the currently playing media content by manipulating the user-manipulable control 12. The user-indicated rating is then communicated to the processor 14, which compiles a content ratings list 18*a* for storage in memory device 18 as the media player 16 plays each media content. The ratings list may be arranged in either an ascending order or descending order such that the most highly rated media content is placed at one end of the list while the least favorite, at another end of the list. As the user changes his or her ratings of the media contents during subsequent playing, the ratings list 18*a* is correspondingly updated. The user's ratings list may later be transmitted to a server configured for compiling ratings data from various users. Using any known automated collaborative filtering method, the server may provide recommendations to this and other users based on the compiled ratings data. For example, the server may recommend an item, e.g., a book or a music compact disc, based on the ratings of the item by users with similar preferences.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A portable media player and rating apparatus, comprising:

a user-manipulable control dedicated for generating a signal indicating a user-supplied rating of a currently played media content in response to a user-supplied rating, the user-supplied rating corresponding to one of a plurality of predefined categories of preferences; and the portable media player being a handheld device and having a memory device and a processor arranged in the portable media player, said memory device arranged for storing media contents and a ratings list comprising a list of user supplied ratings associated with the stored media contents, and said processor being operatively connected to said user-manipulable control and to said memory device for selectively retrieving the stored media contents from said memory device and playing the stored media contents at the portable media player, for receiving the signal from said user-manipulable control, and for associating the user-supplied rating indicated by the signal with the currently played media content, wherein said processor is further operable for ranking the media content in response to the user-supplied ratings in the ratings list and selectively retrieving and playing media content in said memory based on the user-supplied ratings in the ratings list, and said user-manipulable control includes input controls for indicating a positive rating and a negative rating, said processor being operative to move the currently playing content toward the top of the ratings list by a first predetermined amount of slots if the positive rating is indicated and move the currently playing content toward the bottom of the ratings list by a second predetermined amount of slots if the negative rating is indicated, and wherein said processor is further operable for continuously updating a user-supplied rating of the media content based on signals input by the user during subsequent playing of the media content.

2. The device of claim 1, wherein said processor receives the signal from said user-manipulable control as said processor plays the media content stored in said memory device.

3. The device of claim 1, wherein the user-manipulable control includes a switch having a plurality of depressible buttons, each of said plurality of depressible buttons corresponding to one of said plurality of predefined categories of preferences.

4. The device of claim 1, wherein said user-manipulable control includes a multi-position switch movable among different positions, each of said positions corresponding to one of said plurality of predefined categories of preferences.

5. The device of claim 4, wherein the multi-position switch includes a pivotable lever.

6. The device of claim 1, wherein the user-manipulable control is incorporated in a headphone cord for headphones which plugs into the portable media player.

7. The device of claim 1, wherein said user-manipulable control further includes input controls for indicating a most positive rating, a neutral rating, and a most negative rating, said processor being operative to move the currently playing content to the top of the ratings list if the most positive rating is indicated, move the currently playing content up by one slot in the ratings list if the positive rating is indicated, move the currently playing content down by one slot in the ratings list if the negative rating is indicated, and move the currently playing content to the bottom of the ratings list if the most negative rating is indicated.

8. The device of claim 1, wherein said processor is connectable to a server for transmitting the ratings list to a server, whereby the ratings list of user-supplied ratings is comparable with ratings lists of other users.

9. The device of claim 1, wherein said processor is operable for receiving recommendations of items from the server based on ratings of the items by other users with similar preferences.

* * * * *